United States Patent
Nodine et al.

(10) Patent No.: US 10,091,144 B1
(45) Date of Patent: *Oct. 2, 2018

(54) METHOD AND APPARATUS FOR ACCESSING SUPPORT CONTENT

(71) Applicant: FANTHREESIXTY LLC, Kansas City, MO (US)

(72) Inventors: Marian H. Nodine, Austin, TX (US); Christopher J. Guethle, Cedar Park, TX (US); Frederick J. Venter, Driftwood, TX (US); William T. Gravette, Austin, TX (US); Erik J. Noren, Cedar Park, TX (US); Alexander C. Mitchell, III, Shawnee, KS (US)

(73) Assignee: FANTHREESIXTY LLC, Kansas City, MO (US)

( * ) Notice: Subject to any disclaimer, the term of this patent is extended or adjusted under 35 U.S.C. 154(b) by 520 days.

This patent is subject to a terminal disclaimer.

(21) Appl. No.: 14/724,054

(22) Filed: May 28, 2015

Related U.S. Application Data (63) Continuation-in-part of application No. 13/713,295, filed on Dec. 13, 2012, now Pat. No. 9,055,424.

(Continued)

(51) Int. Cl.
*G06F 15/16* (2006.01)
*H04L 12/58* (2006.01)
(Continued)

(52) U.S. Cl.
CPC .......... *H04L 51/046* (2013.01); *G06F 9/4446* (2013.01); *G06F 9/453* (2018.02); *G06F 17/30386* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,502,459 | B1 * | 3/2009 | Moseley | G06Q 10/06311 340/539.13 |
| 2002/0098878 | A1 * | 7/2002 | Mooney | G08B 1/08 455/569.1 |

(Continued)

OTHER PUBLICATIONS eAgile, Tag Verification / Validation Sign Off; created by Megan Tower; Jan. 29, 2014, TVV001 (ref B); 2 pages.

(Continued)

*Primary Examiner* — Moustafa M Meky
*Assistant Examiner* — Sm Z Islam
(74) *Attorney, Agent, or Firm* — Campbell Stephenson LLP (57) ABSTRACT

A method and system for accessing support content are described herein. In one embodiment, a method comprises receiving first and second messages relating to respective first and second devices at a computer system via respective first and second communication links, where the first and second messages comprise respective first and second identification codes. The method further comprises accessing a database to read first information mapped to the first identification code, and selecting, based on the first information, an identity of a first support content item from among identities of a plurality of support content items. The method further comprises generating and sending a third message to a server configured to implement an automated support system comprising the first support content item, where the third message comprises the identity of the first support content item.

21 Claims, 3 Drawing Sheets

Related U.S. Application Data

(60) Provisional application No. 61/570,061, filed on Dec. 13, 2011.

(51) Int. Cl.
*G06F 17/30* (2006.01)
*H04L 29/08* (2006.01)
*G06F 9/44* (2018.01)
*G06F 9/451* (2018.01)

(56) References Cited

U.S. PATENT DOCUMENTS

| | | | |
|---|---|---|---|
| 2003/0123640 A1* | 7/2003 | Roelle | H04M 3/51 |
| | | | 379/265.06 |
| 2005/0171661 A1* | 8/2005 | Abdel-Malek | B61L 27/0094 |
| | | | 701/31.4 |

OTHER PUBLICATIONS eAgile, Tag Verification / Validation Sign Off; created by Megan Tower; Feb. 2014, TVV001 (ref B); 1 page.

Telstra, "Introducing a New 24×7 Support Experience from Telstra", 1 page.

Telstra Corporation Limited; "Contextual Care Trial Post Implementation Review," printed Jan. 9, 2015; 15 pages.

\* cited by examiner

METHOD AND APPARATUS FOR ACCESSING SUPPORT CONTENT

CROSS-REFERENCE TO RELATED APPLICATIONS

The present patent application is a continuation-in-part of U.S. patent application Ser. No. 13/713,295, filed on Dec. 13, 2012, entitled "Method and Apparatus for Accessing Device or Service Support using a Mobile Device", now U.S. Pat. No. 9,055,424, which issued on Jun. 9, 2015, which claims the domestic benefit under Title 35 of the United States Code § 119(e) of U.S. Provisional Patent Application No. 61/570,061 entitled "Method and Apparatus for Accessing Device or Service Support Using A Mobile Device," filed on Dec. 13, 2011. The above-referenced applications are hereby incorporated by reference, in their entirety and for all purposes.

BACKGROUND

Call centers are often operated by a company to administer support for customers who have purchased one or more devices (e.g., set-top box, router, computer, video game console, etc.) or services (e.g., cable television, Internet access, email, etc.). Call centers are expensive. Call centers are typically operated through an extensive open work space for call center agents, with work stations that include a computer for each agent, a telephone set/headset connected to a telecom switch, and one or more supervisor stations. The agents receive telephone requests from customers who seek support for their device or service. The term support includes configuring or reconfiguring a device or service, diagnosing a problem with the device or service, providing a solution to the problem, answering a question about the device or service, etc. The methods and systems described herein will be described with reference to diagnosing and/or providing a solution to a problem with a device or service, it being understood that the methods and systems should not be limited thereto.

As an alternative to call centers staffed with agents, many companies have implemented less expensive, automated systems to handle requests for support from customers. These automated systems execute on computer systems (e.g., servers) that can be accessed via the internet. Unfortunately, automated systems may be difficult for customers to find, access and use, particularly for those customers who are not technically inclined. Customers who lack the appropriate skills or experience with automated systems are often hesitant to use them. Moreover, for those customers who use automated support systems, inaccurate or unreliable data or confusion on the part of the consumer in determining how to obtain the proper support for their requests may result in customer dissatisfaction. Additionally, the content provided to the customer by these systems is based on what the company thinks will be most important to the customer, and not specific to the current context of the customer.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

DETAILED DESCRIPTION

The methods and systems described herein may be used for accessing automated support content for a device or service. In an embodiment, the automated support content is accessed via a mobile device such as a smart phone. In an alternative embodiment, the automated support content is accessed via a computing device such as a personal computer, laptop computer, or tablet computer. In yet another embodiment, the automated support is accessed from a device associated with the support content. Access to automated support content should be intuitive and easy to initiate. There should be a clear association between the problem a customer may have with a device or service and a direct path to automated support content for the problem. The methods and systems described herein may reduce the number of steps that are required to reach the beginning of an automated support content item that is needed to diagnose and/or solve the problem, when compared to prior methods of accessing the same automated support content item. The methods and systems may provide access to automated support content for any one of a variety of devices or services that are provided by any one of a number of different companies.

In general the methods and systems described herein can enable users to more easily and intuitively access automated support content for different types of device and/or service. Moreover, the methods and systems can enable users to more easily and intuitively access separate automated support systems that are provided by different companies (e.g., cable television providers, equipment manufacturers) for respective devices and/or services. Other aspects of the methods and systems are contemplated.

Figure 1:
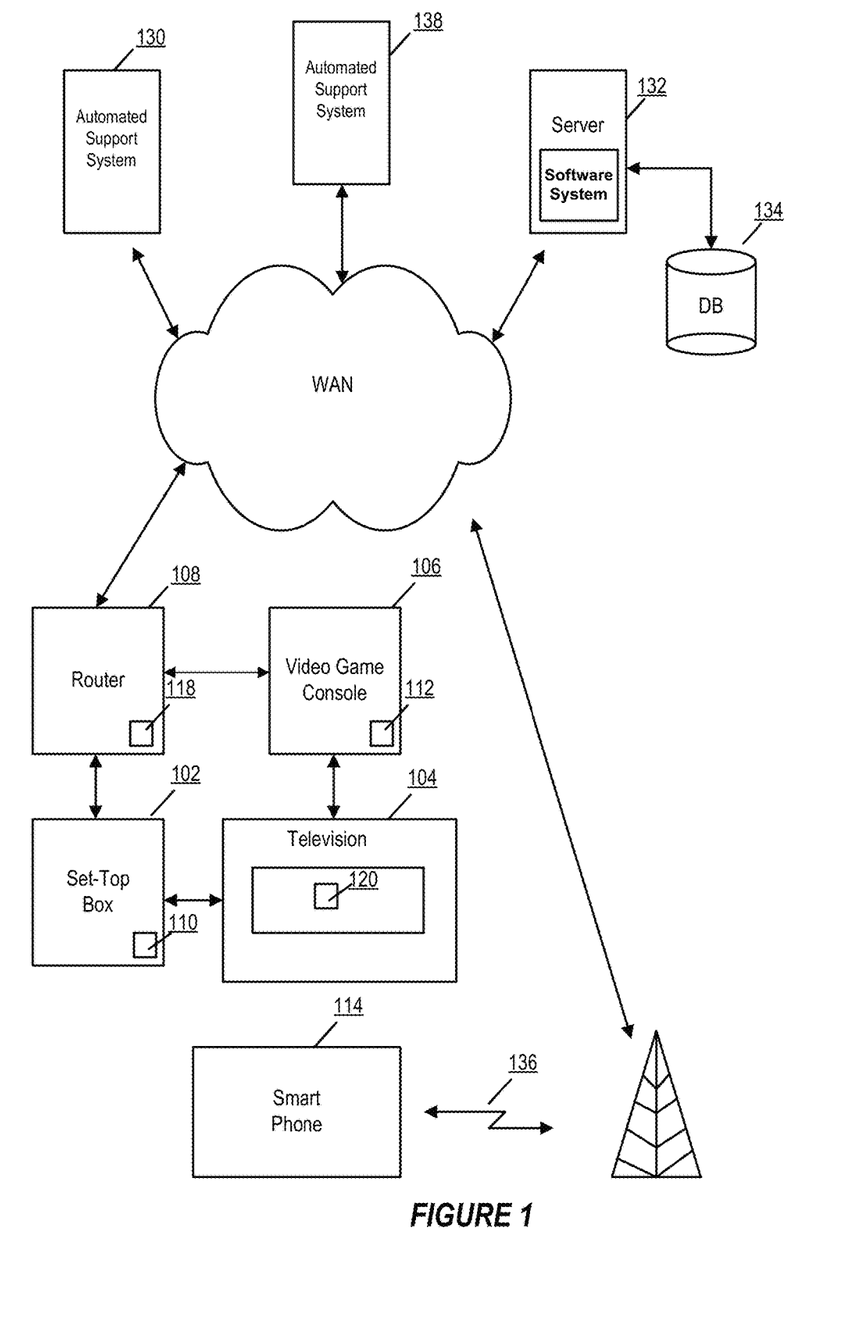
FIG. 1 illustrates certain components of a system employing or employed in one or more embodiments described herein.

FIG. 1 illustrates a system in which the methods described herein can be employed. The system shown in FIG. 1 is an example and should not limit the scope of the methods and systems described herein. FIG. 1 illustrates multiple devices and services that can be supported by an automated process. The system shown includes a set-top box 102 coupled to a television 104 having a display screen; a video game console 106 coupled to the television 104; and a router 108. Although not shown, several services such as cable television, Internet access, etc. are provided via one or more of the devices. Methods and systems will be described with reference to accessing automated support content for set-top box 102, it being understood that the methods and systems can be employed to access automated support content for television 104, console 106, and router 108 in addition to accessing automated support content for other devices (e.g., computer systems, appliances, home security systems, etc.) or services.

In the embodiment of FIG. 1, set-top box 102, video game console 106, and router 108 have physical asset tags 110, 112, and 118, respectively, attached to them. Television 104 can display a virtual asset tag 120 that is dynamically generated by set-top box 102 or video game console 106. An asset tag may store static, readable information about its corresponding device or service. In one embodiment, the asset tag may store a tag identifier, which in turn can directly or indirectly identify a record in a database or other data object that stores information about the corresponding device or service, such as a product number, serial number, date of purchase, Internet address, encryption key, firmware name and/or version number, name of service and/or device provider, identity of subscribed services, service activation date, order pending, technician visits, etc. The asset tag may include additional static, readable information about a corresponding device or service. Virtual asset tags may further include dynamic, readable information (e.g., current device configuration settings, self-diagnostic information, etc.) about its corresponding device or service.

Asset tags 110, 112, 118, and 120 store distinct information, which can be read and used to access respective automated support content such as workflows for solving a problem with a device or service as will be more fully described below. While asset tags contain distinct tag identifiers, when an asset tag is first produced or attached to a product, the tag identifier may or may not directly or indirectly identify a database record or other data object that stores information about the product, a service, a person associated with the product or service, or other products or services associated with that person. If an asset tag has a specific tag identifier that does not directly or indirectly identify a database record or other data object, then a provisioning service (not shown) may be used to perform such association. The provisioning service may interface with another system in which the asset tags are scanned along with a unique identifying label for the device or service in order to create an association between the tag identifier and a device or service identification. The device or service identification may, in turn, be associated with a record in a database or other data object, which may in turn be associated with a customer using that device or service, or other products or services associated with that customer.

In some embodiments, identification information is associated with a device whether or not an asset tag or virtual asset tag is used. The identification information may include an identification code, or unique identifying label as described above. Such an identification code may be uniquely assigned to a device or service. Alternatively or in addition, an identification code may be assigned to a customer associated with one or more devices or services. In an embodiment, each identification code is associated with a database record or other data object containing additional information. Such additional information may include product information, such as model number, serial number, or configuration of the product or a system containing the product. The additional information may also include service information, including, for example, specific services or levels of service associated with a customer or with a device. The additional information also may include customer information—for example, customer billing cycle information or other devices and services used by the customer. In an embodiment, one or more identification codes are provided to a customer in connection with one or more devices or services.

Returning to FIG. 1, in one embodiment asset tag information, which includes the tag identifier, may be encoded in a quick response (QR) code in either the physical or virtual asset tag. QR code is a type of matrix bar code or two-dimensional code. The QR code has become popular due to its fast readability and large storage capacity compared to standard UPC barcodes. The code typically consists of black modules (square dots) arranged in a square pattern on a white background. Asset tag information embedded in a QR code can be read using a QR scanner of, for example, a mobile device (e.g., a smart phone) 114. An embodiment is described herein with reference to use of a smart phone to read data of an asset tag, it being understood that other mobile devices (e.g., tablet computers, net-book computers, etc.) are contemplated. Alternatively asset tag information may be encoded in a near-field communication (NFC) chip of a physical asset tag. NFC allows for simplified data exchange between itself and an NFC reader of, for example, smart phone 114. For purposes of example only, each physical asset tag 110, 112, and 118 includes both a QR code and an NFC chip that encode asset tag information. Virtual asset tag 120 does not include an NFC chip.

In one embodiment, the physical asset tags contain both a QR code and an NFC chip. Additional tag mediums are contemplated as are single medium tags. To enable a single asset tag to work across one or multiple mediums and to accommodate new mediums in the future, an encoding algorithm can be employed that combines an asset tag identifier and a tag medium identifier. The combined tag identifier and tag medium identifier are encoded using an encoding algorithm and the result is stored on the appropriate medium.

The data storage capacity of QR codes and NFC chips is limited. More asset tag information such as settings from a device or service, can be stored on these mediums if data compression is employed. In one embodiment, various compression techniques can be used to store more information within the available data space available based on the medium (e.g., QR code or NFC chip). Techniques employed include use of special numeric bases and dynamic lookup tables. Other techniques are also contemplated.

Figure 3:
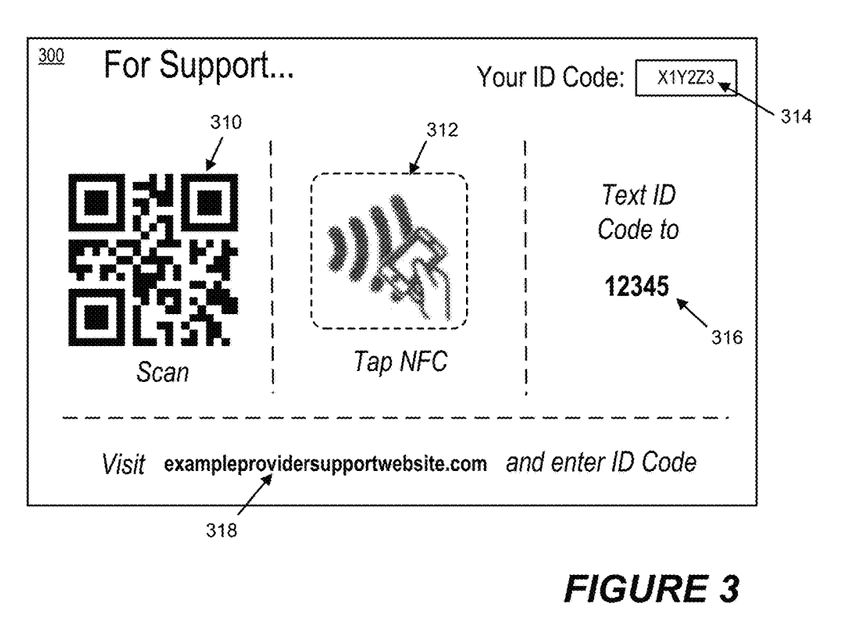
FIG. 3 illustrates an exemplary customer information card relating to one or more embodiments described herein.

In embodiments not involving use of an asset tag affixed to (or displayed upon) a device, there are multiple ways that identification information for a device, service or customer may be made available for use in requesting support. In one embodiment, an asset tag is associated with a customer and provided to the customer in a form that can be accessed in a manner similar to that described herein for asset tags 110, 112, 118 and 120 of FIG. 1. As an example, FIG. 3 illustrates a card 300 that can be provided to a customer associated with a device or service. A card such as card 300 may be issued by, for example, a service provider or a device manufacturer. In the embodiment of FIG. 3, card 300 includes a QR code 310 that may be scanned by a smart phone (or other device with QR reader capability) in the manner described herein for QR code versions of the asset tags shown in FIG. 1. In an embodiment, the information encoded by QR code 310 is associated with a customer rather than with a particular device necessarily. For example, if the customer is associated with multiple devices or services, information encoded by QR code 310 may identify some or all of these devices or services in addition to including an identification code for the customer. In a further embodiment, QR code 310 may encode identification codes for individual devices or services used by the customer as well as an identification code assigned to the customer.

Card 300 also includes an embedded NFC chip 312 (with the area over the chip indicated by a dashed outline). In an embodiment, NFC chip 312 stores identification information the same or similar to that encoded by QR code 310, as described above. Such identification information can be transferred to a smart phone or other device with NFC reader capability. In alternative embodiments, appropriate versions of a card such as card 310 can support additional methods of data transfer to a smartphone or computing device, such as, for example, Bluetooth® or iBeacon® technologies.

As discussed above, QR code 310 and NFC chip 312 function in the manner of the asset tags shown in FIG. 1, except that QR code 310 and NFC chip 312 are not affixed to, or assigned to, a particular device. In addition to these ways of reading identification information, card 300 includes an identification code 314 and descriptions of ways that code 314 can be used to obtain automated support content. In the embodiment of FIG. 3, ID code 314 is a code assigned to a customer using one or more devices or services. Additional ID codes that may in some embodiments be assigned to specific devices or services used by the customer are not explicitly shown on card 300. Although designated "Your ID Code" in the embodiment of FIG. 3, the identification code may of course be referred to in innumerable other ways, such as, for example, a "service" or "support" code, identifier, ID, tag or number. In an embodiment, the identification code is associated with a database record or other data object in the same or a similar manner as the tag identifiers discussed with reference to FIG. 1 herein.

One way provided on card 300 for a customer to use identification code 314 is by sending a text message containing the code to a specific telephone number 316. In the embodiment of FIG. 3, number 316 is illustrated using a simulated "short code" abbreviation for a telephone number, but in other embodiments a full-length telephone number can be provided. In an embodiment, the text message is sent using a Short Message Service (SMS) application. In other embodiments, any suitable application or protocol for text messaging may be used, including Multimedia Messaging Service (MMS) or data protocols such as Extensible Messaging and Presence Protocol (XMPP).

In another method described on card 300 for a customer to access automated support content, a website address 318 is provided. In an embodiment, address 318 is a Uniform Resource Locator (URL) using the http/https protocol (although the http/https designation is typically added by a web browser application, and is not explicitly included in address 318 on card 300). In the embodiment of FIG. 3, the customer is instructed to enter identification code 314 when accessing the website at address 318. In an alternative embodiment, the identification code is embedded in address 318, such that a separate web page is accessed by each customer. In such an embodiment, the customer does not need to enter a code. For the identification code of FIG. 3, a web address embedding the access code may have a format such as exampleprovidersupportwebsite.com/X1Y2Z3. In other embodiments, the code is embedded in a URL in a less explicit way. In additional embodiments, other information, such as information about the customer's equipment configuration, is embedded in a website URL. In such an embodiment, the URL may contain identification information in addition to the identification code, where the additional identification information is similar to information that may be in included in QR code 310 or NFC chip 312. It is further noted that a website address such as address 318, whether or not it includes an embedded identification code or other identification information, may be encoded into a QR code such as QR code 310. In such an embodiment, scanning of QR code 310 by a QR code reader (such as a smartphone application for this purpose) will automatically open the associated web page if the scanning device includes a web browser application.

As described above, a card such as card 300 provides a customer with multiple alternative ways to request automated support information. It is noted that card 300 is merely one example of a collection of alternative methods, and other methods of providing an identification code or other identification information may also be used, such as, for example, encoding an identification code in a one-dimensional bar code such as a UPC code. In another embodiment, an email address for sending the customer's identification code by electronic mail is provided on card 300. In a further embodiment, the code is embedded in the email address. As another example, identification code 314 from card 300 can be captured as an image by a customer using a smart phone camera, and then sent as an attachment in a text message or email message to a respective telephone number or email address provided on the card. Character recognition technology is then employed by the issuer of card 300 to extract the code. In an alternative embodiment, character recognition is employed in the customer's smart phone to extract the code, which is then communicated using, for example, email, text message, or entry into a web page. In yet another embodiment, a customer's identification code is derived from a biometric image corresponding to the customer, such as an image of the customer's face, or a finger or thumb print, or a retinal scan. In this embodiment, the customer could send the biometric image, for example as an attachment to an email or text message. An image recognition and translation routine is used to extract the identification code from the image, either after the message is received or in the device sending the message.

A card such as card 300 may be implemented in any suitable format, such as cardboard, plastic, or a multilayer laminate. In an embodiment, card 300 is dimensioned to be carried in a wallet. In some embodiments, card 300 may include a magnetic layer suitable for removably adhering the card to a metal surface. In other embodiments, card 300 may be implemented using a plastic film that clings to smooth surfaces. For embodiments of card 300 not including an NFC chip or other embedded circuitry, the card can be provided as an image, for example by sending an image of the card to a customer by email or text message.

The options discussed above in connection with FIG. 3 involve initiation by a customer of a communication for requesting automated support content. In other embodiments of the methods and systems described herein, a communication may be initiated by a service provider or equipment manufacturer. For example, a link to a website such as that associated with web address 318 is sent to a customer in an email message or text message. In an embodiment, the link is to a web page specific to the customer, such as a web page with the customer's identification code embedded in its URL. The communication in these embodiments is initiated by the sender of the initial email or text message to the customer, and the customer can continue the communication when necessary or desired by simply selecting (i.e., "clicking on") the link within the message. As another example, a text message or electronic mail message is sent to the customer, with instructions to reply to the message when assistance is needed. In an embodiment, the originating telephone number (for a text message) or email address (for an electronic mail message) is specific to the customer. For example, the email address may have the customer's identification code embedded in it, or the email address or telephone number may associated with the customer's identification code in a database record or other data structure.

Sometimes it is necessary to secure the identification information, including identification codes and/or asset tag information, while it is stored and transmitted to a server. Because many mediums and transmission protocols (HTTP GET, for example) are inherently not secure, a data security protocol can be used in one embodiment. The security protocol allows for secure, encrypted storage of sensitive information on otherwise insecure mediums. The security protocol also allows for secure, encrypted transmission of sensitive information to a server via insecure transmission protocols. In one embodiment a mechanism can be employed for identifying which identification information is secure and which is not. In a further embodiment, only information identified as secure is encrypted. Secure encrypted data can be stored and transmitted alongside information which is not secure or encrypted.

FIG. 1 includes smart phone 114 having, in this embodiment, a QR scanner and an NFC reader that can read asset tag information of a QR code and/or an NFC chip of asset tag 110, 112, 118, or 120. In general, when a user seeks automated support for a device or service, the user can easily access the support through smart phone 114. More particularly, the support can be accessed by first scanning or reading the asset tag information using the QR scanner or NFC reader of smart phone 114. For purposes of explanation only, an embodiment will be described with respect to a problem a user is experiencing with set top box 102 or a service provided there through. As such, the embodiment will be described with reference to smart phone 114 reading asset tag information of asset tag 110. This asset tag identifier of the asset tag 110 directly or indirectly identifies a database record or other data object that contains information about set top box 102 or service provided via set top box 102. In an embodiment, such a data object also contains information about the customer who owns or rents the set-top box, and about other devices in the customer's installation.

Smart phone 114 can transmit a request message for automated support to computer system (e.g., server) 132. "Automated support" as used herein may include various content items, such as workflows to be performed, self-help resources or links to such resources, videos, or frequently-asked questions (FAQs). The request message may include asset tag information, including the asset tag identifier, read by the QR scanner or NFC reader. The request may also include additional information such as information about the owner of smart phone 114, which can be found in memory of the smart phone 114. In one embodiment, if the asset tag stores compressed information, smart phone 114 may decompress the information scanned or read from the asset tag before it is transmitted in the request to server 132. In another embodiment, server 132 may decompress information included in a request message.

A support request message can be sent using any of the methods described above in connection with FIGS. 1 and 3, by a smart phone or other handheld communication device, or by a computing device as appropriate (for message submission via a website, for example). In some embodiments, submission of a support request message is done via an application program running on the sending device. In the case of a smartphone application (or "app"), for example, a customer may request automated support content by clicking on a "help" button or other appropriate icon within the app. In another embodiment, a notification or alert presented by the application may suggest that the customer send a support request message. In a further embodiment, the notification or alert includes a link or other means by which the customer can send the support request message. Use of a notification within an application allows the communication to be initiated by, for example, a service provider or device manufacturer rather than by the customer. Such an embodiment may be particularly useful if a service issue for a customer is detected by the provider, or if an upgrade to a customer's equipment is necessary. In embodiments for which one or more devices associated with a customer have communications capability and the ability to run the same application (or a compatible application), a notification or alert can also be sent by a device if, for example, a problem is detected within the device.

A support request message may be sent via an application on a computing device, such as a personal computer, in the same or similar ways as described above for a smartphone application. The application program may be stored locally on the computing device (or communication device) in some embodiments. Alternatively, the application may be a web-based application accessed through a web page. In some embodiments, a support request message may also be sent via an application on a device such as devices 102, 104, 106 and 108 of FIG. 1. Devices with the communication and control capabilities to allow sending of a support request message are, in some embodiments, devices compatible with the so-called "Internet of Things," and may include all sorts of devices, such as household appliances. The sending of a support request may be initiated either via the integrated app or via a built in "help button" on the device. To display the resulting information to the user, in one embodiment such a device has an integrated display screen for use with an application, and some means of interacting with the application, such as a touchscreen, keypad, or remote control unit. In an alternative embodiment, an application in a device uses a display screen associated with another device. In the case of an application for a set-top box or video game console, for example, the user interface of the application may be displayed on a connected television, and users may interact with a remote control unit for either the television or the set-top box/game console. In the case of an application for a router or modem, the user interface of the application may be displayed and interacted with using a computer connected to the router or modem, in the manner that administration functions for such devices are often implemented.

Whether accessed through a mobile communications device, a computing device, or a device related to the content of a support request message (such as the devices of FIG. 1), an application sending a support request message includes, in some embodiments, one or more identification codes embedded in a file of the application. The code may be embedded, for example, in the executable code of the application or in installation files for the application. In a further embodiment, an identification code embedded in a file of the application is included with a support request message sent by the application, without a need for customer entry of the code. In some embodiments, particularly when the application is for a computing device or a communications device, an embedded identification code is a code associated with a customer. In some embodiments for which the application is on a device related to the content of a support request message, the embedded code in the application is associated with the device or a service that uses the device. In some embodiments the application includes embedded identification codes for the customer and for one or more devices or services associated with the customer. In some embodiments, an application running on a device related to the content of a support request message may send a message without involvement of the customer, such as when a malfunction with the device is detected by the application. Support request messages sent via an application running on a device may also include status information related to the device, including any recent error messages or other related device metrics. For a set-top box, for example, such metrics may include how much storage capacity is being used. A support request message sent by an application may be sent with any suitable service or protocol.

A software system such as a rules engine or recommendation system, which may take form in instructions executing on one or more processors of server 132, can receive the support request message sent in any of the ways described above. The software system can access and read a database record or other data object using the identification code or tag identifier of the received request message in order to retrieve information (e.g., serial number, manufacturer, service activation date, etc.) about, for example, set top box 102 or the service provided there through.

In one embodiment, the software system can then process the information from the database record or other data object and that contained in the request message to identify and select an automated support system from among several automated support systems that will help address the problem with set top box 102 or its service. Each of the automated support systems may include multiple sets of support content, including workflows, videos, articles, etc., that support respective devices or services. If the selected automated support system contains several distinct support content items, the software system may use the information read from the database record or other data object, in addition to other information (e.g., device or service configuration information, diagnostic information, etc.) to identify a support content item that is most appropriate for addressing the problem with the device or service.

In another embodiment, the software system uses information from the request message and the associated database record or data object to select a support content item from among multiple support content items. The support content items may be associated with any of multiple automated support systems, where an automated support system may be associated with, for example, a particular product or service. Selection of a particular support content item then leads to selection of an automated support system including that content item.

In a further embodiment, the software system selects the support content item based at least in part on user input. For example, the software system may identify a set of support content items appropriate to a support request message from among the multiple support content items, based on information in the message and in the associated database record or data object. Such information may include the current context of the device, the customer associated with the device, services associated with the device, or any other devices or services associated with the customer. The set of support content items may come from within one automated support system, or from across multiple automated support systems. In an embodiment, the software system maintains profiles of the multiple support content items for use in selecting the set of support content items. The set of support content items is in some embodiments arranged in a ranked list. The set of support content items (or some representation of the items, such as a title or summary of each) is returned to the customer who sent the support request message (either via the device sending the support request message or via some other device associated with the customer). A selection by the customer of one or more of the support content items from the set is then received. The customer can select the support content item by selecting a representation of the item from a list presented in an application or through any other suitable mechanism.

Upon selection of a support content item through any of the methods described herein, the software system can update and send the request message via the WAN (e.g., Internet) to a computer system (e.g., server) 130 that implements an automated support system that includes the selected support content item. In an embodiment in which the request is received via smart phone 114, the updated request may include information identifying the smart phone 114 and/or the owner thereof. The updated request may include an identity of the content item (e.g., workflow) of the automated system that was selected and particularly well suited to support the device (e.g., set-top box 102). The updated request may include the Internet address of the device (e.g., set top box 102) that can used to enable the selected automated system to remotely access the device (e.g., set top box 102) in accordance with the selected content item to gather configuration information, run diagnostic tests, gather diagnostic information, etc. The updated request may include dynamic asset tag information read from a virtual tag such as device configuration settings or self-diagnostic test information, which can be used by the selected content item (e.g., workflow) in diagnosing or correcting a problem with the device, which may eliminate the need to remotely access the device. The request may include additional information generated by the software system or provided by the initial support request message.

When the selected automated system receives the updated request from the software system, the selected automated system generates and sends a reply to the requesting device, which can be identified in the updated request, that contains the relevant content selected by the software system. In response to receiving the reply, the requesting device, such as smart phone 114, can present the relevant content, which is not limited to, but could include the presentation of a menu of options, the playing of a video, the initiation of a workflow or the presentation of a guide. Other content types are also contemplated. When presented, content that engenders further interaction among the user, device, and support system, for example, a workflow, can establish an automated support session for the user via the requesting device. In an embodiment, the support session can be established via a customer device such as a smart phone even if the initial support request message is from a different device. In a further embodiment, customer profile information associated with the customer's identification code indicates a preference for which device is used for automated support sessions. An automated support session supports the device (e.g., set-top box 102) and may include a step-by-step process that is displayed by, for example, the smart phone to enable the user of the smart phone to manually diagnose and fix a problem with the device. The session may alternatively display a button on smart phone 114 that, when activated by the user, prompts the selected automated support system to remotely diagnose and fix a problem with the device (e.g., set-top box 102).

In another embodiment, the asset tag identifier and other information read via the QR scanner or NFC reader of smart phone 114 can be processed by an automated support system that is native to the smart phone 114 in order to select one of multiple sets of content items such as a workflow that are stored in smart phone for supporting respective devices or services. The native support system can select and initiate a content item suitable for supporting the device based on the asset tag information. The content item, when initiated, can start a support session with the user of the smart phone 114. This session may include a display a step-by-step process by the smart phone of to enable the user of the smart phone to manually trouble shoot and correct a problem with the device (e.g., set-top box 102).

Figure 2:
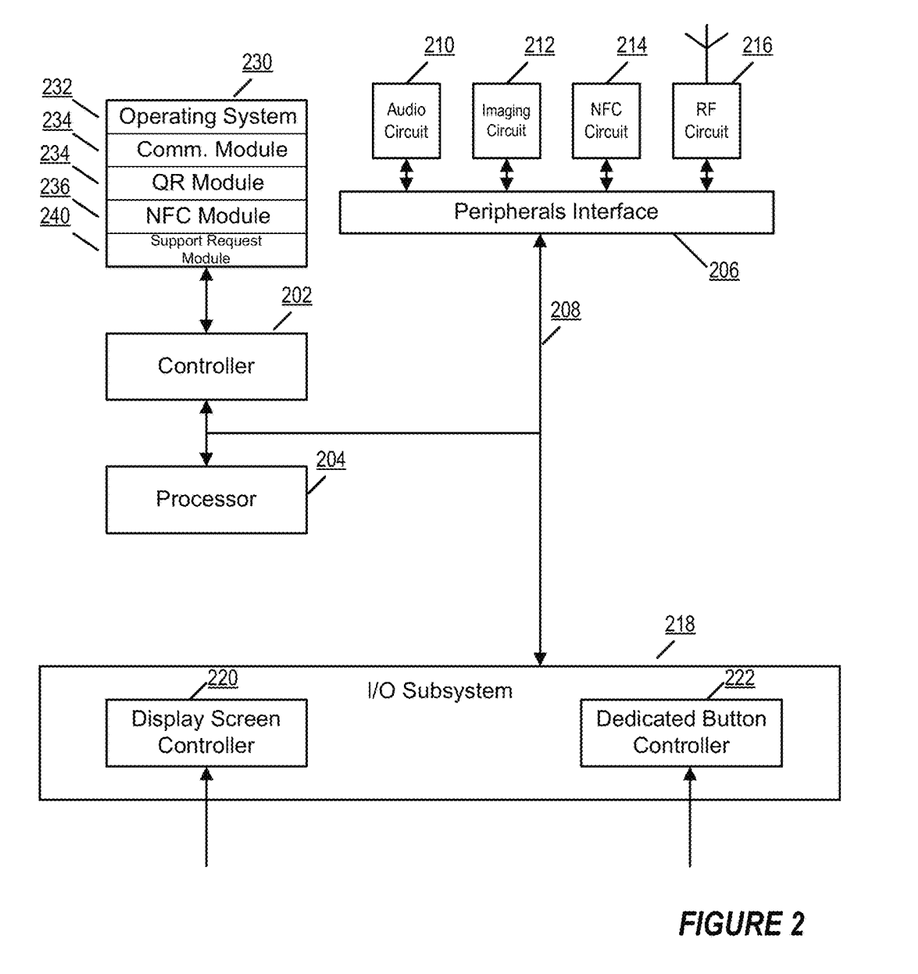
FIG. 2 illustrates certain components of a mobile device employing or employed in one or more embodiments described herein.

As noted above, smart phone 114 includes a QR scanner and an NFC reader in the embodiment of FIG. 1. FIG. 2 illustrates in block diagram form, additional components of an example smart phone 114, it being understood the term "smart phone" should not be limited thereto. With continuing reference to FIG. 1, smart phone 114 includes a memory controller 202 coupled to a processor 204 and a peripherals interface 206. The various components of smart phone 114 may be coupled by one or more communication buses or signal lines 208. The peripherals interface 206 is coupled to an audio circuit 210, and imaging circuit 212 of a camera (not shown), an NFC reader circuit 214, and a radio frequency (RF) circuit 216. The imaging circuit 212 can generate signals corresponding to asset tag identifiers and other information embedded in a QR code of a virtual or physical asset tag that is scanned by camera (not shown). The NFC circuit 214 can generate signals corresponding to asset tag identifier and other information embedded in an NFC chip that is read by the NFC reader.

The peripherals interface 206 is coupled to an I/O subsystem 218 that contains various controllers that interact with other components of smart phone 114. I/O system 218 includes a display screen controller 220 coupled to the display screen (not shown) of the smart device, which can be used during a support session to, for example, display a step-by-step manual process provided by a workflow of an automated support system for diagnosing and correcting a problem with a device such as set-top box 102 or the service provided there through. The display screen may also be used to display a set of content support items to a customer so that the customer can select an item to access. In an embodiment the set of content support items is displayed as a ranked list. The display screen can be used to display the graphical user interface presented by an application as described herein, including any appropriate information, icons, selection buttons, and so forth. In some embodiments, a dedicated button of smart phone 114, for example a button on the housing of the phone, may be used to initiate a support related function such as sending the initial support request message. Dedicated button controller 222 in I/O system 218 may be used to control such a button and interface it to appropriate applications.

Memory controller 202 is coupled to a memory 230, which may take form in one or more types of computer readable memory. Memory 230 stores several software components or modules that can be executed on processor 204. For example, memory 230 includes an operating system 232, and a communication module 234 that enables communication between smart phone 114 and server 132 or server 138 via communication link 136 and RF circuit 216. Additionally, memory 230 includes a QR module 234, NFC module 236, and support request module 240. QR module 234 is capable of receiving and processing signals from imaging circuit 212 in order to reproduce asset tag information of a scanned physical or virtual asset tag. NFC module 236 is capable of receiving and processing signals received from NFC circuit 214 in order to reproduce asset tag information read from a physical asset tag. Support request module 240, which is in data communication with NFC module 236 and QR module 234, is capable of processing asset tag information generated by NFC module 236 or QR module 234. The request module 240 is also capable of generating a support request message for subsequent transmission to server 132 via communication module 234 and wireless communication link 136. The request module 240 is also capable of interaction with relevant content (e.g., workflow) provided by, for example, the automated support system of server 138 during a device support session. Alternatively, support request module 240 may simply implement the native automated support system mentioned above. Although not shown, additional components within memory 230 may contain information that is unique to the particular smart phone 114. For example, the additional information may include the identification of an owner of smart phone 114, or a list of devices that can be supported by automated support systems. Further information unique to smart phone 114 and stored in memory 230 is contemplated.

As noted above, devices such as set-top box 102, console 106, or router 108 are subject to problems that can be supported by, for example, automated support system executing on server 130 or server 138 via smart phone 114 and the software system executing on server 132. When a problem occurs, a user can seek the support via smart phone 114 or through other devices, as discussed above. To illustrate, suppose a problem exists with set-top box 102 that inhibits its ability to receive content from a cable television provider. In this situation, a user can in one embodiment scan the QR code or read the NFC chip of physical asset tag 110 using smart phone 114. For purposes of explanation only, it will be presumed that the user scans the QR code of physical asset tag 110.

In response to scanning the QR code, imaging circuit 212 can generate signals corresponding to the asset tag identifier and/or other information that is embedded in the QR code. QR module 234 can process the signals from imaging circuit 212 to reproduce the asset tag identifier and/or other information. This asset tag identifier and/or other information can then be provided to request module 240. In one embodiment, request module 240 generates and sends a support request message to server 132 via wireless communication link 136. This request message may include at least some or all of the asset tag identifier and/or other information from QR module 234. Additional information stored in memory 230 may be sent with the request message.

In response, the software system of server 132 may use the asset tag identifier to access data mapped thereto in database 134 that is relevant to set-top box 102, or to its associated services, the customer associated with box 102, or to other services and devices associated with the customer. This data, in turn, can be used by the software system to eventually forward to smart phone 114 a solution to the problem with set-top box 102. For example, the software system may use the serial number of the set-top box 102 stored in database 134 and other information that is needed to identify and select automated support system on server 138 (as opposed to the automated support system executing on server 130) as the appropriate system for providing automated support to smart phone 114. Further, the software system may use information of the support request message and information mapped in database 134 to identify a content item of the automated support system on server 138 for diagnosing and/or correcting the problem with set-top box 102. Alternatively, the software system may first identify an appropriate support content item, in some embodiments selecting the support content item based in part on input from the customer. An automated support system may then be selected because it contains the selected support content item.

Thereafter, the software system may update the support request with an indication of the selected content, and send the request to the selected automated support system. When the automated support system receives the support request from the software system, in one embodiment, the selected content item may remotely access set-top box 102 to read configuration information or other information stored therein. The other information may include self-diagnostic information gathered by set-top box 102. The content item may process the configuration information and other information received from set-top box 102 and attempt to identify one or more problems thereof. If the problem is diagnosed, the content item may generate and implement a solution to fix the problem. Alternatively, the server implementing the selected automated support system can transmit relevant content regarding the solution to smart phone 114 via a reply message. Request module 240 of smart phone 114 receives the reply message and its support content via wireless communication link 136 and communication module 234. In response, request module processes the relevant content for subsequent display on a screen of smart phone 114 as a solution for solving the problem. The displayed solution may take form in a series of steps to be implemented by the user against set-top box 102 for the purpose of correcting the problem thereof. In a preferred embodiment, the displayed solution information may include a button, that when activated, instructs a content item (e.g., workflow executing on server 138) to remotely access and fix the problem with set-top box 102 via the WAN. In response to receiving this activation, server 138 remotely implements the solution to correct the problem with set-top box 102.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. As one example, in certain situations such as office or retail environments devices such as routers, televisions and video game consoles may be deployed in relatively close proximity to a database, software system, and automated support system(s) as illustrated by FIG. 1. In such an embodiment, a more localized communication technology such as Bluetooth® or iBeacon® may be used in place of the wide area network of FIG. 1.

We claim:

1. A method of handling a request, the method comprising:
   receiving at a computer system via a first communication link a first message relating to a first device, wherein the first message comprises a first identification code;
   accessing a database to read first information mapped to the first identification code;
   selecting an identity of a first support content item from among identities of a plurality of support content items, wherein at least a portion of the first information is used in selecting the identity of the first support content item, wherein the first support content item is for addressing a problem relating to the first device, and wherein the first support content item is accessible via one of a plurality of automated support systems;
   receiving at the computer system via a second communication link a second message relating to a second device, wherein the second message comprises a second identification code;
   selecting an identity of a second support content item from among identities of the plurality of support content items, wherein the identity of the second support content item is selected using at least a portion of second information mapped to the second identification code;
   generating and sending a third message to a server configured to implement the automated support system comprising the first support content item, wherein the third message comprises the identity of the first support content item; and
   generating and sending a fourth message to a server configured to implement an automated support system comprising the second support content item.

2. The method of claim 1 wherein selecting the identity of the first support content item comprises:
   selecting identities of a first set of support content items, wherein at least a portion of the first information is used in selecting the identities of the first set of support content items;
   presenting to a user associated with the first message the identities of the first set of support content items; and
   receiving from the user a selection of the first support content item from within the first set of support content items.

3. The method of claim 2 wherein presenting to the user the identities of the first set of support content items comprises presenting a ranked list of the identities of the support content items within the first set of support content items.

4. The method of claim 1 wherein
   the first device comprises communication capability; and
   the first message is sent by the first device.

5. The method of claim 4 wherein the first message is received via an application program running on the first device.

6. The method of claim 4 wherein the first device is a household appliance.

7. The method of claim 1 wherein the first message is sent by a first computing device.

8. The method of claim 7 wherein the first message is received via an application program running on the first computing device.

9. The method of claim 1 wherein the first message is sent by a first handheld communication device.

10. The method of claim 9 wherein the first message is received via an application program running on the first handheld communication device.

11. The method of claim 1 wherein the first message comprises a request for technical support for the first device.

12. The method of claim 1 wherein the first message comprises a support request for a service associated with the first device.

13. The method of claim 1 wherein the first message comprises a support request for a customer associated with the first device.

14. The method of claim 1 wherein the first message is received via a World Wide Web (WWW) site.

15. The method of claim 14 wherein the first identification code is embedded in a Uniform Resource Locator for the WWW site.

16. The method of claim 14 further comprising:
   prior to receiving the first message, sending a link to the WWW site to a first handheld communication device via a text messaging protocol.

17. The method of claim 14 further comprising:
   prior to receiving the first message, sending an electronic mail message comprising a link to the WWW site.

18. The method of claim 1, wherein the first message is received via a text messaging protocol.

19. The method of claim 1, wherein the first message comprises an electronic mail message.

20. A memory storing instructions executable by one or more processors of a computer system to implement a method, the method comprising:
- receiving at the computer system via a first communication link a first message relating to a first device, wherein the first message comprises a first identification code;
- accessing a database to read first information mapped to the first identification code;
- selecting an identity of a first support content item from among identities of a plurality of support content items, wherein at least a portion of the first information is used in selecting the identity of the first support content item, wherein the first support content item is for addressing a problem relating to the first device, and wherein the first support content item is accessible via one of a plurality of automated support systems;
- receiving at the computer system via a second communication link a second message relating to a second device, wherein the second message comprises a second identification code;
- selecting an identity of a second support content item from among identities of the plurality of support content items, wherein the identity of the second support content item is selected using at least a portion of second information mapped to the second identification code;
- generating and sending a third message to a server configured to implement the automated support system comprising the first content support item, wherein the third message comprises the identity of the first support content item; and
- generating and sending a fourth message to a server configured to implement an automated support system comprising the second support content item.

21. The memory of claim 20 wherein selecting the identity of the first support content item comprises:
- selecting identities of a first set of support content items, wherein at least a portion of the first information is used in selecting the identities of the first set of support content items;
- presenting to a user associated with the first message the identities of the first set of support content items; and
- receiving from the user a selection of the first support content item from within the first set of support content items.

* * * * *